United States Patent
Harter

(10) Patent No.: US 11,858,337 B2
(45) Date of Patent: Jan. 2, 2024

(54) COOLING AIR OPENING, AND MOTOR VEHICLE FRONT END HAVING A COOLING AIR OPENING

(71) Applicant: Dr. Ing. h.c. F. Porsche Aktiengesellschaft, Stuttgart (DE)

(72) Inventor: Sebastian Harter, Weissach (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 26 days.

(21) Appl. No.: 17/187,891

(22) Filed: Mar. 1, 2021

(65) Prior Publication Data

US 2021/0268895 A1    Sep. 2, 2021

(30) Foreign Application Priority Data

Mar. 2, 2020 (DE) .................... 10 2020 105 447.5

(51) Int. Cl.
*B60K 11/08* (2006.01)
*B62D 25/08* (2006.01)

(52) U.S. Cl.
CPC ............ *B60K 11/085* (2013.01); *B62D 25/08* (2013.01)

(58) Field of Classification Search
CPC . B60R 19/48; B60R 19/023; B60R 2019/486; B60K 11/085; Y02T 10/88
See application file for complete search history.

(56) References Cited

U.S. PATENT DOCUMENTS

| | | | | |
|---|---|---|---|---|
| 1,699,020 A * | 1/1929 | Raleigh | ..................... | F01P 7/10 49/77.1 |
| 8,646,552 B2 * | 2/2014 | Evans | ..................... | B60R 19/12 180/68.1 |
| 10,569,643 B2 * | 2/2020 | Gilotte | .................. | B60K 11/08 |
| 2002/0153182 A1 * | 10/2002 | Vaillancourt | ............ | B62J 17/02 180/68.1 |
| 2011/0070817 A1 * | 3/2011 | Walters | ..................... | F01P 7/10 454/155 |

(Continued)

FOREIGN PATENT DOCUMENTS

DE    19508112 A1    9/1996
DE    102014106264 A1    11/2015

(Continued)

*Primary Examiner* — Kurt Philip Liethen
(74) *Attorney, Agent, or Firm* — LEYDIG, VOIT & MAYER, LTD.

(57) ABSTRACT

A cooling air opening arrangement is for a motor vehicle front end. The cooling air opening arrangement has a peripheral edge surrounding a cooling air opening, and a plurality of slats. The slats are arranged substantially in parallel to one another and extend in the cooling air opening within the peripheral edge. The slats are arranged in a pivotably mounted manner in such a way that, in a first pivoting position, the slats are arranged such that the cooling air opening is substantially open for air flow and, in a second pivoted position, the slats are arranged to close the cooling air opening. The cooling air opening arrangement further has a peripheral sealing frame against which the slats bear in a sealing manner. The peripheral sealing frame being provided on the peripheral edge. Adjacent ones of the slats bear against one another in a sealing manner.

11 Claims, 2 Drawing Sheets

(56) References Cited

U.S. PATENT DOCUMENTS

| | | | | |
|---|---|---|---|---|
| 2012/0074729 A1* | 3/2012 | Fenchak | ............... | B60K 11/085 296/193.1 |
| 2012/0168125 A1* | 7/2012 | Johnston | ............... | F28D 1/0443 165/96 |
| 2012/0247018 A1* | 10/2012 | Stokes | ................. | B60K 11/085 49/89.1 |
| 2013/0068403 A1* | 3/2013 | Fenchak | ............... | B60K 11/085 160/218 |
| 2015/0345578 A1* | 12/2015 | Nightingale | .......... | F16D 65/847 188/264 AA |
| 2020/0276885 A1* | 9/2020 | Düll | ..................... | B60H 1/3421 |
| 2021/0316598 A1 | 10/2021 | Pacher et al. | | |

FOREIGN PATENT DOCUMENTS

| | | |
|---|---|---|
| DE | 102017007203 A1 | 1/2019 |
| DE | 102018119639 A1 | 2/2020 |

\* cited by examiner

COOLING AIR OPENING, AND MOTOR VEHICLE FRONT END HAVING A COOLING AIR OPENING

CROSS REFERENCE TO PRIOR APPLICATIONS

Priority is claimed to German Patent Application No. DE 10 2020 105 447.5, filed on Mar. 2, 2020, the entire disclosure of which is hereby incorporated by reference herein.

FIELD

The invention relates to a cooling air opening and to a motor vehicle front end having a cooling air opening.

BACKGROUND

A motor vehicle front end may be provided with cooling air openings through which cooling air flows into the motor vehicle front end in order to flow against heat exchangers provided in the motor vehicle front end. This brings about heat exchange between a fluid running through the heat exchanger and the air such that the fluid in the heat exchanger is cooled. As the air flows through the cooling air openings, the latter produce an air resistance, which has an influence on the drag coefficient of the motor vehicle.

In this context, there exist motor vehicles that have an arrangement of slats that are pivotable in a cooling air opening in order to close the cooling air opening, as required, to reduce the drag coefficient if the driving state of the motor vehicle or the environmental conditions allow.

It is shown here, however, that the cooling air opening cannot actually be effectively closed by means of the slats, resulting in a rather large peripheral gap remaining, in particular at the edge of the cooling air opening, that, even in the closed state of the cooling air opening, produces a remaining cooling air flow that has a negative effect on the drag coefficient of the motor vehicle. Reference is made in this respect to DE 10 2014 106 264 A1.

SUMMARY

In an embodiment, the present invention provides a cooling air opening arrangement for a motor vehicle front end. The cooling air opening arrangement has a peripheral edge surrounding a cooling air opening, and a plurality of slats. The slats are arranged substantially in parallel to one another and extend in the cooling air opening within the peripheral edge. The slats are arranged in a pivotably mounted manner in such a way that, in a first pivoting position, the slats are arranged such that the cooling air opening is substantially open for air flow and, in a second pivoted position, the slats are arranged to close the cooling air opening. The cooling air opening arrangement further has a peripheral sealing frame against which the slats bear in a sealing manner. The peripheral sealing frame being provided on the peripheral edge. Adjacent ones of the slats bear against one another in a sealing manner.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
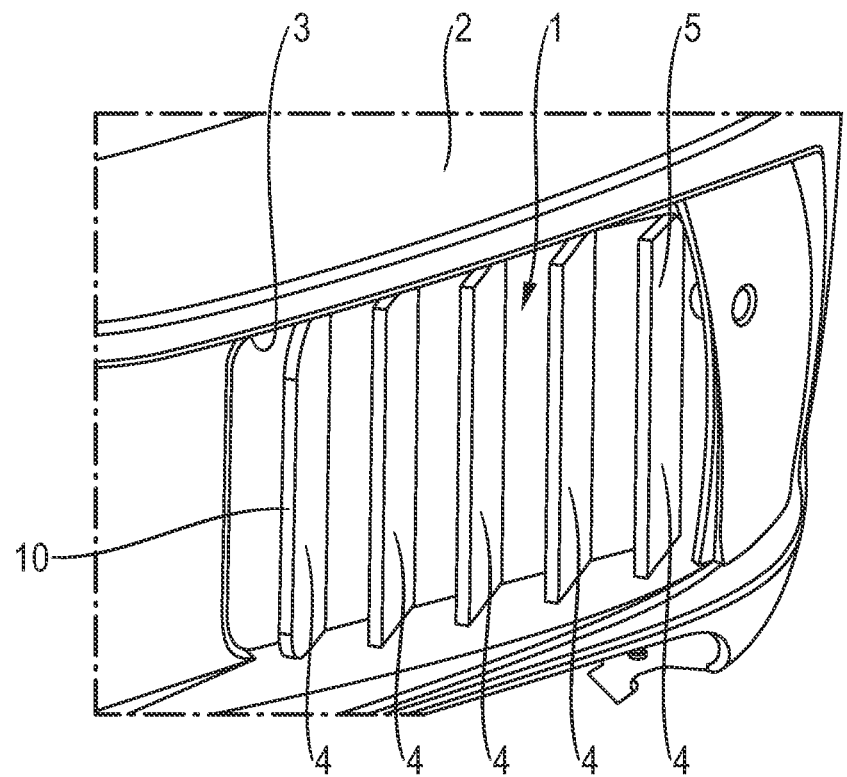
FIG. 1 shows a schematic, perspective partial illustration of a motor vehicle front end having a cooling air opening with slats in a first pivoted position of the slats.

In an embodiment, the present invention provides a cooling air opening and a motor vehicle front end having a cooling air opening that is improved in relation to the prior art and can positively influence the drag coefficient of the motor vehicle.

One exemplary embodiment of the present invention relates to a cooling air opening having a peripheral edge and having a number of slats, which are arranged substantially parallel to one another and extend in the cooling air opening within the peripheral edge. The slats are arranged in a pivotably mounted manner in such a way that, in a first pivoted position, they are arranged in such a way that they substantially free the cooling air opening and, in a second pivoted position, close the cooling air opening. A peripheral sealing frame against which the slats bear in a sealing manner is provided on the peripheral edge. Adjacent slats bear against one another in a sealing manner. This ensures that, in the second pivoted position, the cooling air opening is substantially sealed, with the result that the positive influence on the drag coefficient is not reduced by unnecessary leakages.

It is also expedient if the sealing frame is mounted on the edge of the cooling air opening by means of a holding frame. Consequently, the sealing frame can be individually and quickly mounted on the motor vehicle front end in the region of the cooling air opening and also be quickly exchanged as required.

It is also expedient if the sealing frame is fastened to the holding frame or mounted or formed in one piece therewith, in particular by means of injection-molding. This allows simple and cost-effective assembly.

It is particularly advantageous if the sealing frame is produced from a thermoplastic material or an elastomer material, and the holding frame is produced from a thermoplastic material. It is thus possible for the sealing frame to be produced from a hard and substantially rigid material or from a soft, elastic material, with the holding frame advantageously consisting of a hard thermoplastic material so as to allow a durably stable fastening of the sealing frame to, for example, a motor vehicle front end.

It is also particularly advantageous if the slats have longitudinal sides, in particular if the slats have a basic body, which has longitudinal sides which are of stepped design such that two adjacent slats in the second pivoted position bear against one another by way of their mutually adjoining longitudinal sides and form a labyrinth seal between them. This makes it possible to ensure that a leakage flow between slats is small.

In a further exemplary embodiment, it is also expedient if the slats have a basic body on which there is provided at least one articulation by means of which the slat can be pivoted about an axis of rotation, wherein the axis of rotation extends outside the basic body. This ensures that the slat is not disturbed by the articulation and its axis of rotation when bearing against the sealing frame, which can lead to leakages. Here, the articulation connects the basic body of the slat to the axis of rotation, which is arranged spaced apart from the basic body and thus ensures a defined distance between the basic body and axis of rotation, with the result that the sealing frame can be arranged between the basic body and axis of rotation.

It is also advantageous if the sealing frame defines a plane, wherein the slats, at least in the second pivoted position, are arranged on one side of the plane, while the respective axes of rotation of the slats extend on the other side of the plane. This ensures that the axis of rotation is remote from the sealing frame and does not have a disturbing effect on the sealing.

It is also advantageous if the slats can be pivoted by means of at least one drive in the same direction between the first pivoted position and the second pivoted position about their respective axis of rotation. This facilitates not only the bearing and the sealing with respect to the sealing frame but also the bearing and sealing of the slats among themselves.

One exemplary embodiment of the invention relates to a motor vehicle front end having at least one cooling air opening according to the invention.

It is also advantageous here if the motor vehicle front end is formed with two cooling air openings which are arranged spaced apart from one another, wherein the slat arrangements of the two cooling air openings are arranged mirror-symmetrically to a center plane. This ensures a good appearance with expedient air guidance in the first pivoted position.

FIGS. 1 to 5 show in different illustrations a cooling air opening 1 in a motor vehicle front end 2. The cooling air opening 1 is an opening in the motor vehicle front end 2 that has a peripheral edge 3 which delimits the cooling air opening 1 from the motor vehicle front end 2.

Furthermore, the cooling air opening 1 has a number of slats 4 which are arranged substantially in the spatial region of the cooling air opening 1 within the edge 3. Here, the slats 4 extend in the cooling air opening 1 within the peripheral edge 3.

The slats 4 are arranged substantially parallel to one another and have a basic body 5. Furthermore, the slats 4 have, in addition to the basic body 5, at least one articulation 6 by means of which the slats 4 can be pivoted about an axis of rotation 7. The articulation thus connects the basic body 5 to the axis of rotation 7 or to the pivot point on the axis of rotation 7. It can be seen here that the axis of rotation 7 extends outside the basic body 5.

The slats 4 are here arranged in the motor vehicle front end 2 in a pivotably mounted manner in such a way that, in a first pivoted position (see FIGS. 1 and 4), they are arranged in such a way that they substantially free the cooling air opening 1.

Furthermore, the slats 4 are arranged and are adjustable in such a way that, in a second pivoted position (see FIGS. 2, 3 and 5), they close the cooling air opening 1.

Figure 2:
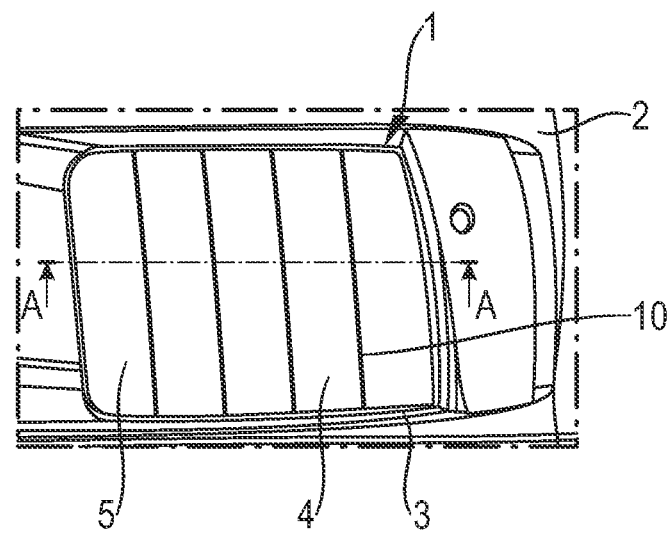
FIG. 2 shows a schematic, perspective partial illustration of a motor vehicle front end having a cooling air opening with slats in a second pivoted position of the slats.
Figure 3:
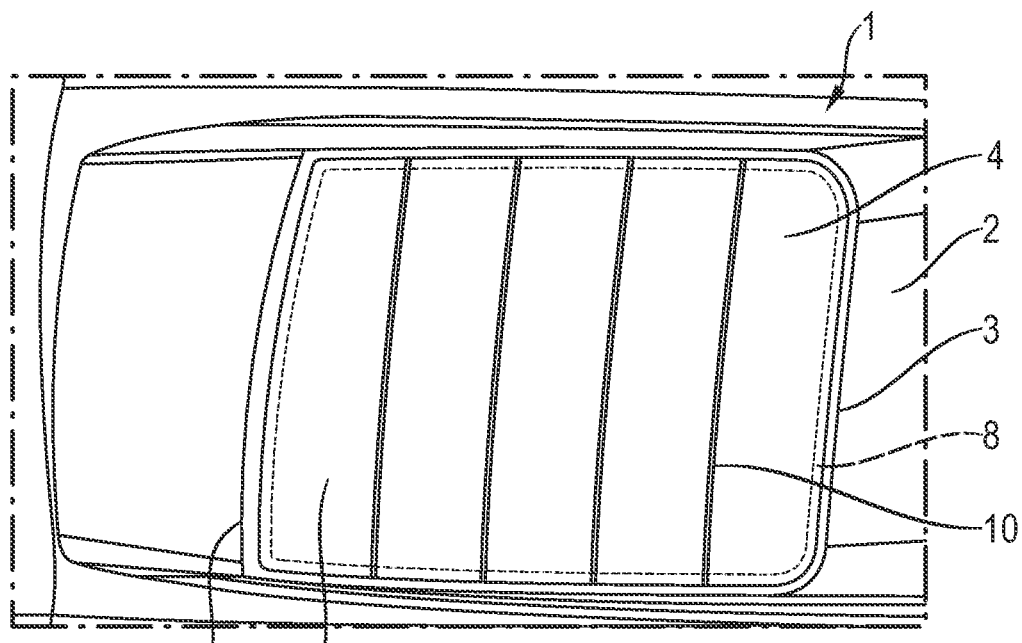
FIG. 3 shows a schematic, perspective partial illustration of a motor vehicle front end having a cooling air opening with slats in a second pivoted position of the slats, but viewed on the rear side of the slats.
Figure 5:
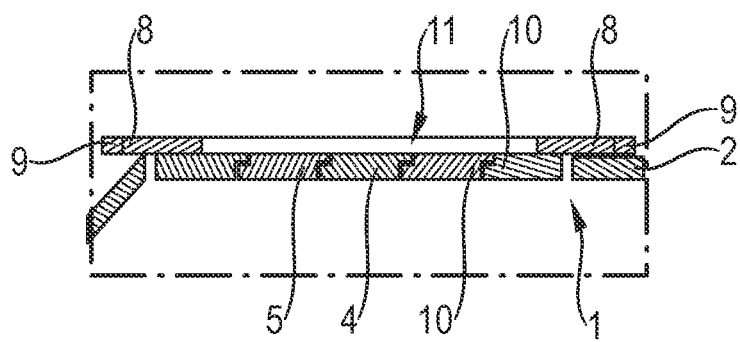
FIG. 5 shows a schematic sectional illustration of the cooling air opening with the slats according to FIG. 2.

To provide tight bearing of the slats 4 against the circumference of the cooling air opening 1, a peripheral sealing frame 8 is provided on the peripheral edge 3. It is on this sealing frame 8 that the slats 4 bear in a sealing manner in the second pivoted position. Here, adjacent slats 4 then also bear against one another in a sealing manner. This largely reduces or prevents a leakage air flow between the slats 4 and edge 3 and also between the slats 4 among themselves. FIGS. 2, 3 and 5 show that the slats 4 bear against one another and also against the sealing frame 8.

The sealing frame 8 is preferably and optionally mounted on the edge 3 of the cooling air opening 1 by means of a holding frame 9. Here, the holding frame 9 is connected to the motor vehicle front end 2 which forms the edge 3. Here, the sealing frame 8 is fastened to the holding frame 9 or mounted or formed in one piece therewith, in particular by means of injection-molding. It is thus possible for the sealing frame 8 and the holding frame 9 to be produced in one piece, for example by one-component injection-molding or by two-component injection-molding.

The sealing frame 8 is preferably produced from a thermoplastic material or from an elastomer material. Accordingly, the sealing frame 8 would be rather hard and rigid or rather soft and elastic. The holding frame 9 is preferably produced from a thermoplastic material. However, it could also be otherwise produced, for example from a metal.

The figures show that the slats 4 are designed as planar structures with their basic body 5 having a rather narrow and elongate configuration. Here, the slats 4 have longitudinal sides 10, which are stepped in design such that two adjacent slats 4 in the second pivoted position (see FIG. 5) bear against one another by way of their mutually adjoining longitudinal sides 10 and form a labyrinth seal. The gap 11 which results between the two longitudinal sides 10 has a step-shaped path here.

Figure 4:
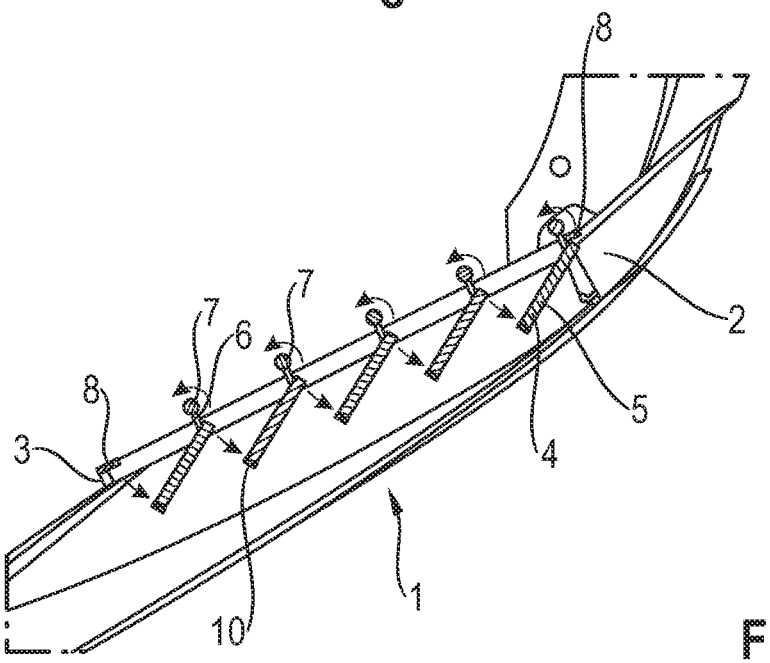
FIG. 4 shows a schematic sectional illustration of the cooling air opening with the slats according to FIG. 1.

In order to ensure that good sealing can occur, it is also advantageous if the sealing frame 8 defines a plane, wherein the slats 4, at least in the second pivoted position, are arranged on one side of the plane, whereas the respective axes of rotation 7 of the slats 4 extend on the other side of the plane. In FIG. 4, this is shown for the first pivoted position, with it being the case that this also applies in principle to the second pivoted position.

It is also particularly advantageous if the slats 4 can be pivoted by means of at least one drive in the same direction between the first pivoted position and the second pivoted position about their respective axis of rotation 7. This makes it possible to effectively achieve the mutual bearing in the second pivoted position according to FIG. 5.

The figures each show only one cooling air opening 1, with it also being advantageous if the motor vehicle front end 2 has two such cooling air openings 1 which are ideally arranged symmetrically to the vehicle center. Accordingly, these cooling air openings 1 would be arranged spaced apart from one another in the motor vehicle front end 2. It would also be advantageous here if the slat arrangements of the two cooling air openings 1 were arranged mirror-symmetrically to a center plane. This would result in a visually appealing appearance.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C

LIST OF REFERENCE SIGNS

1 Cooling air opening
2 Motor vehicle front end
3 Edge
4 Slat
5 Basic body
6 Articulation
7 Axis of rotation
8 Sealing frame
9 Holding frame
10 Longitudinal side
11 Gap

The invention claimed is:

1. A cooling air opening arrangement for a motor vehicle front end, the cooling air opening arrangement comprising:
a peripheral edge surrounding a cooling air opening and a plurality of slats, which are arranged substantially parallel to one another and extend in the cooling air opening within a plane fully delimited by the peripheral edge,
wherein the slats are arranged in a pivotably mounted manner in such a way that, in a first pivoting position, the slats are arranged such that the cooling air opening is substantially open for air flow and, in a second pivoted position, the slats are arranged to close the cooling air opening,
wherein the cooling air opening arrangement further comprises a peripheral sealing frame against which the slats bear in a sealing manner, the sealing frame being provided on the peripheral edge,
wherein the sealing frame is mounted on the peripheral edge of the cooling air opening arrangement by a holding frame,
wherein adjacent ones of the slats bear against one another in a sealing manner,
wherein the sealing frame defines a plane, and
wherein the slats, at least in the second pivoted position, are arranged entirely on one side of the plane, whereas respective axes of rotation of the slats extend on the other side of the plane.

2. The cooling air opening arrangement as claimed in claim 1, wherein the sealing frame is fastened to the holding frame or mounted or formed in one piece therewith.

3. The cooling air opening arrangement as claimed in claim 1, wherein the sealing frame comprised of a thermoplastic material or an elastomer material, and the holding frame is comprised of a thermoplastic material.

4. The cooling air opening arrangement as claimed in claim 1,
wherein the slats have longitudinal sides which are stepped such that two adjacent ones of the slats, in the second pivoted position, bear against one another by way of their mutually adjoining longitudinal sides and form a labyrinth seal.

5. A cooling air opening arrangement for a motor vehicle front end, the cooling air opening arrangement comprising:
a peripheral edge surrounding a cooling air opening and a plurality of slats, which are arranged substantially parallel to one another and extend in the cooling air opening within a plane fully delimited by the peripheral edge,
wherein the slats are arranged in a pivotably mounted manner in such a way that, in a first pivoting position, the slats are arranged such that the cooling air opening is substantially open for air flow and, in a second pivoted position, the slats are arranged to close the cooling air opening,
wherein the cooling air opening arrangement further comprises a peripheral sealing frame against which the slats bear in a sealing manner, the sealing frame being provided on the peripheral edge,
wherein the sealing frame is mounted on the peripheral edge of the cooling air opening arrangement by a holding frame,
wherein adjacent ones of the slats bear against one another in a sealing manner, and
wherein each slat of the slats has a basic body on which there is provided at least one articulation configured to pivot the slat about an axis of rotation, and wherein the axis of rotation is offset from the basic body.

6. The cooling air opening arrangement as claimed in claim 1, wherein the slats being coupled to at least one drive that is configured to pivot the slats in a same direction between the first pivoted position and the second pivoted position about their respective axis of rotation.

7. A motor vehicle front end comprising at least one cooling air opening arrangement as claimed in claim 1.

8. A motor vehicle front end comprising two cooling air opening arrangements each as claimed in claim 1 that are arranged spaced apart from one another, wherein arrangements of the slats of the two cooling air opening arrangements are arranged mirror-symmetrically to a center plane.

9. The cooling air opening arrangement as claimed in claim 2, wherein the sealing frame and holding frame together are one-piece injection-molded part.

10. The cooling air opening arrangement as claimed in claim 1, wherein the peripheral edge is formed integrally with the motor vehicle front end and the holding frame is mounted to the peripheral edge.

11. The cooling air opening arrangement as claimed in claim 1, wherein in the second pivoted position, the slats each extend in alignment with the plane fully delimited by the peripheral edge.

* * * * *